United States Patent [19]

Ekstrand et al.

[11] Patent Number: 5,048,032
[45] Date of Patent: Sep. 10, 1991

[54] AIR COOLED RF INDUCTION EXCITED ION LASER

[75] Inventors: John P. Ekstrand, Palo Alto; John P. Goldsborough, Los Altos; David L. Wright, Redwood City, all of Calif.

[73] Assignee: Spectra-Physics, San Jose, Calif.

[21] Appl. No.: 554,785

[22] Filed: Jul. 18, 1990

[51] Int. Cl.5 .............................................. H01S 3/04
[52] U.S. Cl. ........................................ 372/34; 372/38; 372/82; 372/37; 372/30
[58] Field of Search ...................... 372/34, 29, 30, 38, 372/82, 37

[56] References Cited

U.S. PATENT DOCUMENTS

| | | | |
|---|---|---|---|
| 3,554,275 | 1/1971 | Schade, Jr. | 372/35 |
| 3,593,184 | 10/1969 | Paine | 372/35 |
| 4,397,025 | 8/1983 | Kebabian | 372/37 |
| 4,455,658 | 6/1984 | Sutter, Jr. | 372/35 |
| 4,715,039 | 12/1987 | Miller et al. | 372/35 |
| 4,847,852 | 7/1989 | Yatsiv et al. | 372/87 |
| 4,891,819 | 1/1990 | Sutter, Jr. et al. | 372/38 |
| 4,903,276 | 2/1990 | Ross | 372/38 |

*Primary Examiner*—Leon Scott, Jr.
*Attorney, Agent, or Firm*—Fliesler, Dubb, Meyer & Lovejoy

[57] ABSTRACT

A laser structure utilizes air cooling and RF induction excitation of a gaseous active medium. A means for exciting the active medium is provided including a switching power supply utilizing pulse width modulated switching to provide an RF energy output. The RF output is coupled to a tank circuit which comprises a capacitor, an inductor, and at least one coupling structure. A means for generating a magnetic field along the axial length of the laser bore is provided and can comprise either permanent magnets or a DC source coupled to the coupling structure. The laser further includes means for dissipating heat from the laser bore by utilizing the coupling structures as convective cooling fins with forced air circulated thereabout.

24 Claims, 4 Drawing Sheets

AIR COOLED RF INDUCTION EXCITED ION LASER

BACKGROUND OF THE INVENTION

1. Field of the Invention

The invention relates to a novel structure for a laser utilizing a gaseous active medium which reduces sputtering effects, optimizes efficiency and utilizes air cooling.

2. Description of Related Art

Ion lasers, in general, are of a type which utilize a gaseous active medium and emit an output in both the visible and ultraviolet regions of the spectrum. Three types of gasses which may be used as active media in ion lasers are Argon (Ar), Krypton (Kr) and Xenon (Xe). In typical applications, pure gas is used with normal operating pressure slightly under 1 torr.

Typically, ion lasers include discharge tubes which are excited by a high-current discharge that passes along the length of the tube and is concentrated in a small-diameter bore, or at the center of the discharge tube. The most common means of accomplishing excitation of the active medium is through arrangement of an anode and cathode placed at opposing ends of the laser bore. A high-current discharge in the bore is formed upon application of a potential between the anode and cathode. Typically, an initial voltage spike of a few thousand volts is required to ionize the gas, after which the voltage may be maintained at a level in the range of, for example, approximately 90 to 600 volts with the discharge current at approximately 10–70 amps.

Several problems arise from typical anode/cathode methods of exciting the gaseous active medium in ion lasers. Specifically, strong electron flow in the discharge current tends to push neutral atoms toward the positively charged anode, while ions migrate towards the negative cathode. This migration creates a need for gas circulation in the tube to ensure uniform excitation. Further, upon excitation, the ionized plasma contained in the laser tube reaches high temperatures causing a sputtering effect which erodes both the laser bore and the anode and cathode. The sputtering also leads to entrapment of the gas, which requires a supply of extra gas to replenish gas depleted during operation. Typically, ion lasers use a magnetic field parallel to the axis of the laser bore to concentrate the discharge current to the center of the bore.

The intense heat generated in exciting the gas necessitates cooling of the laser bore. Both air-cooled and water-cooled methods of cooling have been utilized in ion lasers. Water-cooling ion lasers generally involves arranging water circulation along the outer surface of the bore. Such structures generally increase the complexity and bulk of the laser. Air-cooled lasers are of a variety of types generally using forced air circulation and some form of convection cooling structure about the bore to provide heat dissipation.

Other methods of exciting ion lasers have been utilized in the prior art. One such method of exciting the active medium is through the use of RF energy coupled by means of a waveguide to the laser bore. An RF excited laser structure is shown in U.S. Pat. No. 3,521,119 to Ahmed et al. wherein the RF energy is coupled by means of a waveguide and coupling coils, the waveguide comprising a 2-plate transmission line with the two plates tapered towards each other. Coupled to the transmission line is a plurality of coils oriented in a collinear serial relationship having their respective opposite ends coupled to the first and second plates. RF energy is supplied to the distal ends of the waveguide plates and travels down the transmission line, reaching each of the taps in successive order.

Another RF excitation structure is shown in U.S. Pat. No. 4,513,424 wherein X-band microwaves are coupled to the active medium through means of a coupling plate forming a common wall between a waveguide and an RF cavity to produce a standing wave pattern in the waveguide which excites the active medium.

Yet another RF induction method for exciting an active laser medium was used in the Spectra Physics Model SP 141 laser which utilized a tube-type RF source to excite the laser active medium. More particularly, a helical coupling coil was provided about the plasma tube to couple RF energy to excite the active medium. The SP 141 also included a closed-loop cooling structure arranged around the helical coupling coil and mineral-free water was pumped through the tubular cooling structure to cool the laser bore.

SUMMARY OF THE INVENTION

An object of the invention is to provide a novel means for exciting an ion laser using RF energy.

A further object of the invention is to provide a novel power supply arrangement for efficiently providing RF energy to excite the laser medium.

A further object of the invention is to provide the above objects using a pulse width modulated switching power supply.

A further object of the invention is to provide the above objects in a novel laser structure wherein the means for exciting the laser also serves as a convection cooling means for providing air cooling to the laser medium.

A further object of the invention is to provide the above objects in a structure capable of reducing sputtering effects within the laser bore.

A further object of the invention is to provide the above objects in a laser structure wherein the RF energy used to excite the active medium is capable of being applied to each of a plurality of portions of the active medium in a number of different a phase relationships.

These and other objects of the invention are accomplished by a laser having a laser bore containing an active medium comprising a rare gas. The laser includes a means for exciting the active medium including a switching power supply utilizing pulse width modulated switching to provide an RF energy output. The output of the power supply is coupled to a tank circuit which comprises a capacitor, and at least one coupling structure acting as an inductor. The coupling structure is generally helical shaped, and surrounds the laser bore in a collinear serial relationship with respect to the bore. A means for generating the magnetic field along the axial length of the laser bore is provided and can comprise either permanent magnets or a DC source coupled to the coupling structure. The laser further includes a means for dissipating heat from the laser preferably utilizing the coupling structures as convection cooling fins with forced air circulated thereabout.

In one embodiment, the power supply's RF output is inductively coupled to the coupling structure using an RF transformer having a secondary winding coupled in series with the coupling structure and a primary winding coupled to the RF output.

In an alternative embodiment, the power supply can comprise a single-ended class C amplifier or oscillator configured to provide DC to the coupling structures to provide the magnetic field along the length of the laser bore.

DETAILED DESCRIPTION OF THE INVENTION

The invention will be described with respect to the specific embodiments thereof. Other objects, embodiments, and features of the invention will be apparent from a reading of the detailed description in conjunction with the drawings and the claims.

Figure 1:
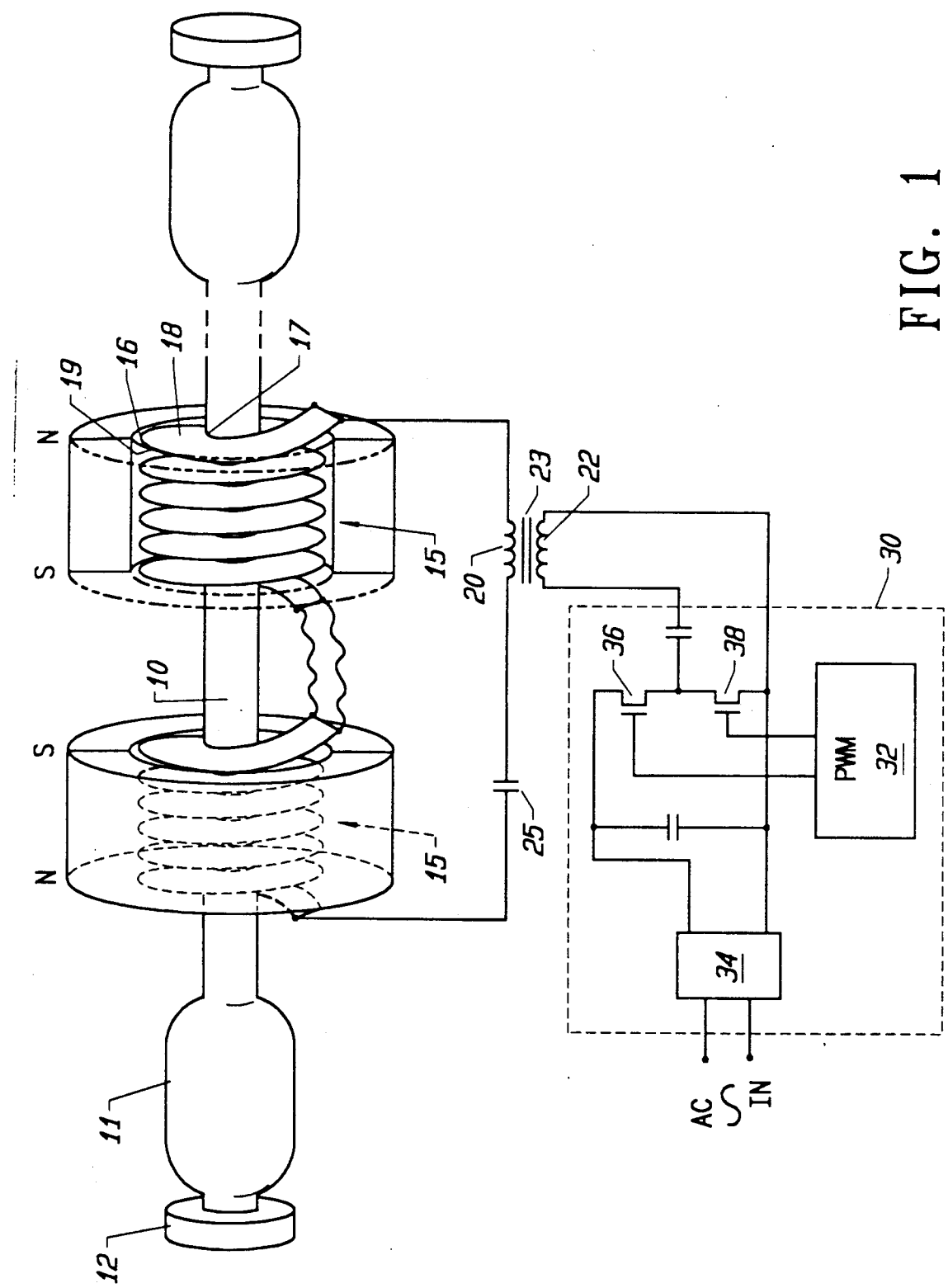
FIG. 1 is a schematic diagram of a first embodiment of the ion laser structure of the present invention.

FIG. 1 shows a first embodiment of the ion laser of the instant invention. A laser bore 10 of a diameter less than that of laser tube 11 is used to form the excitation region within laser tube 11 containing a gaseous active laser medium. Laser bore 10 is preferably made of a ceramic material such as beryllia (BeO) or aluminum oxide (AlO). End caps 12 are shown at the ends of tube 11 for purposes of this description. End caps 12 preferably define external optics which can comprise, for example, mirrors or brewster windows for transmitting the output of the laser.

The active medium is preferably a gas such as Argon (Ar), Krypton (Kr) or Xenon (Xe). The particular dimensions of laser bore 10 and discharge tube 11 ar dependent on the specific type of active medium employed, and the desired power output of the device.

FIG. 1 also shows a means for exciting the active medium in laser bore 10 comprising power supply 30 and a tank circuit formed by secondary winding 20 of transformer 23, capacitor 25, and coupling structures 15 which are arranged about laser bore 10. Coupling structures 15 can comprise, for example, Williamson windings manufactured by Williamson Winding Co., 1611 East Edinger Avenue, Santa Ana, Calif., 92705. Generally, coupling structures 15 are helical in shape with each annular portion thereof having an outer edge 16, and inner edge 17, and a first side 18, and second side 19. Coupling structures 15 are formed of a continuous material of about 10 turns per inch. First and second sides 18 and 19 of the structure 15 are preferably flat between outer edge 16 and inner edge 17, with a width of several millimeters and a thickness of about 0.7 mm. First and second flat sides 18, 19 provide a large area for heat transfer with the air cooling medium. Other shapes could be used to enhance the heat transfer characteristics, if desired. Coupling structures 15 are preferably composed of a material such as copper. In the preferred embodiment of the invention, coupling structures 15 are brazed to the laser bore.

Power supply 30 preferably comprises a pulse width modulated switching power supply which converts an AC main input of approximately 120 volts, 60 Hz to an RF frequency voltage output in the range from 10 KHz-1 MHz. Such power supplies typically include pulse width modulated switching control 32, MOSFET switches 36 and 38, and a rectifier bridge 34. Many such supplies are commercially available, such as the IPX Induction Heating series of power supplies from Advanced Energy Industries, Inc. 1600 Prospect Parkway, Fort Collins, Colo. 80525. In one embodiment of the invention, the output of power supply 30 is preferably coupled to primary winding 22 of transformer 23. Transformer 23 may comprise a ferrite core with toroidal windings 20, 22. In such a configuration, the RF energy output from power supply 30 is inductively coupled to the tank circuit and laser bore 10.

In operation, the RF energy generated in power supply 30 is transmitted via the tank circuit, and specifically coupling structures 15, to laser bore 10.

The excitation means disclosed in FIG. is advantageous in that the tank circuit is a closed-circuit loop whereby power is controlled by increasing or decreasing the power supplied to the tank circuit and thus the amplitude of the tank circuit's oscillation. Power is injected in series with the load (coupling structures 15), thus allowing for a higher Q of the tank circuit and increased efficiency of the laser. In effect, to coupling structures 15, the power supply appears as an open output, without the losses associated with conventional, parallel-coupled voltage supplies. In such a configuration, the unloaded Q of the tank circuit can range from approximately 100–1000. The specific capacitance of capacitor 25 is adjusted such that the tank circuit resonates at the desired excitation frequency, in accordance with well-known principles of circuit theory.

Thus, efficiency of the laser is improved by eliminating rectification and filtering power losses normally present in conventional power supplies. Further, the coupling structures 15 provide a means for exciting the active medium within laser bore 10 which virtually eliminates the problems associated with typical anode/cathode excitation systems. As there is no anode or cathode within laser tube 11, sputtering and contamination in the active medium are decreased.

FIG. 1 further shows means for generating a magnetic field parallel to the axis of laser bore 10. In the embodiment shown in FIG. 1, permanent magnets 14 are arranged with opposing polarity with respect to each other and generate an axial magnetic field. Upon excitation of the active medium, the excited medium within laser bore 10 will be confined to the center of laser bore 10 by the axial magnetic field. As is well known in the art, this reduces sputtering effects within laser bore 10 and leads to more efficient excitation of the gas.

As can be seen from FIG. 1, any number of coupling structures 15 and permanent magnets 14 can be utilized in conjunction with the present invention. It is known that, where coupling structures 15 are operated such that the RF energy pumped to eaoh is in phase, light amplitude modulation due to the time varying excitation of the medium will exist. As will be described in more detail below, amplitude modulation can be reduced by multi-phase operation of the coupling structures 15.

The laser structure shown in FIG. 1 also provides a significant advantage over prior-art laser structures in that laser bore 10 may be convectively cooled by utilizing the brazed coupling structures 15 as convective cooling fins. Coupling structures 15 dissipate the heat associated with the excitation of the active medium. Forced-air cooling means (not shown) can be utilized to direct air flow upon coupling structures 15 to optimize cooling.

Figure 2:
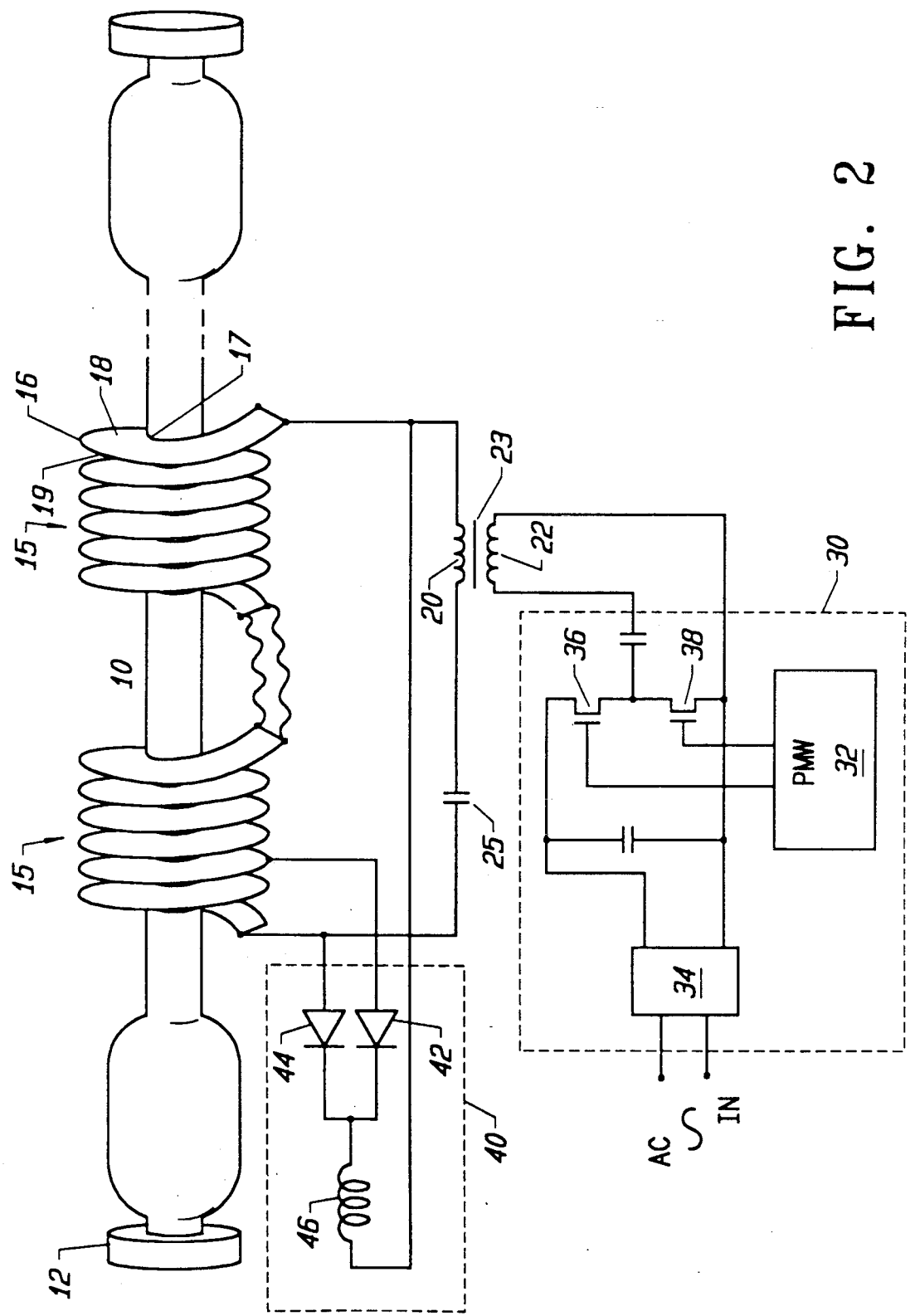
FIG. 2 is a schematic diagram of a second embodiment of the ion laser structure of the present invention showing an alternative means for providing an axial magnetic field.

FIG. 2 shows an alternative embodiment of the present invention. In this embodiment, like numbers are used to describe elements in common with the embodiment shown in FIG. 1.

FIG. 2 specifically shows an alternative method for generation of a magnetic field parallel to the axis of the laser bore, which is accomplished by conducting a DC current through coupling structures 15 to generate an axial magnetic field. In one embodiment of the invention, the DC current through coupling structures 15 can be supplied, for example, from an outside source. In another embodiment of the invention (shown in FIG. 2), a DC supply 40 is provided by tapping the RF energy pumped to coupling structures 15 and generating a current therefrom for feedback into coupling structures 15. In this configuration, the axial magnetic field is generated by coupling structures 15, eliminating the need for the permanent magnets. DC supply 40 can comprise, for example, diodes 42 and 44, and RF choke 46. Diodes 42 and 44 can be coupled to coupling structures 15 such that a relatively constant DC supply can be generated at the output of RF choke 46.

In this embodiment, the axial magnetic field may be selectively reversed under the control of the laser designer by altering the direction of the DC flow into coupling structures 15. In addition, this embodiment provides for improved air flow for convective cooling of laser bore 12 when using coupling structures 15 as convection cooling fins as described above.

Figure 4:
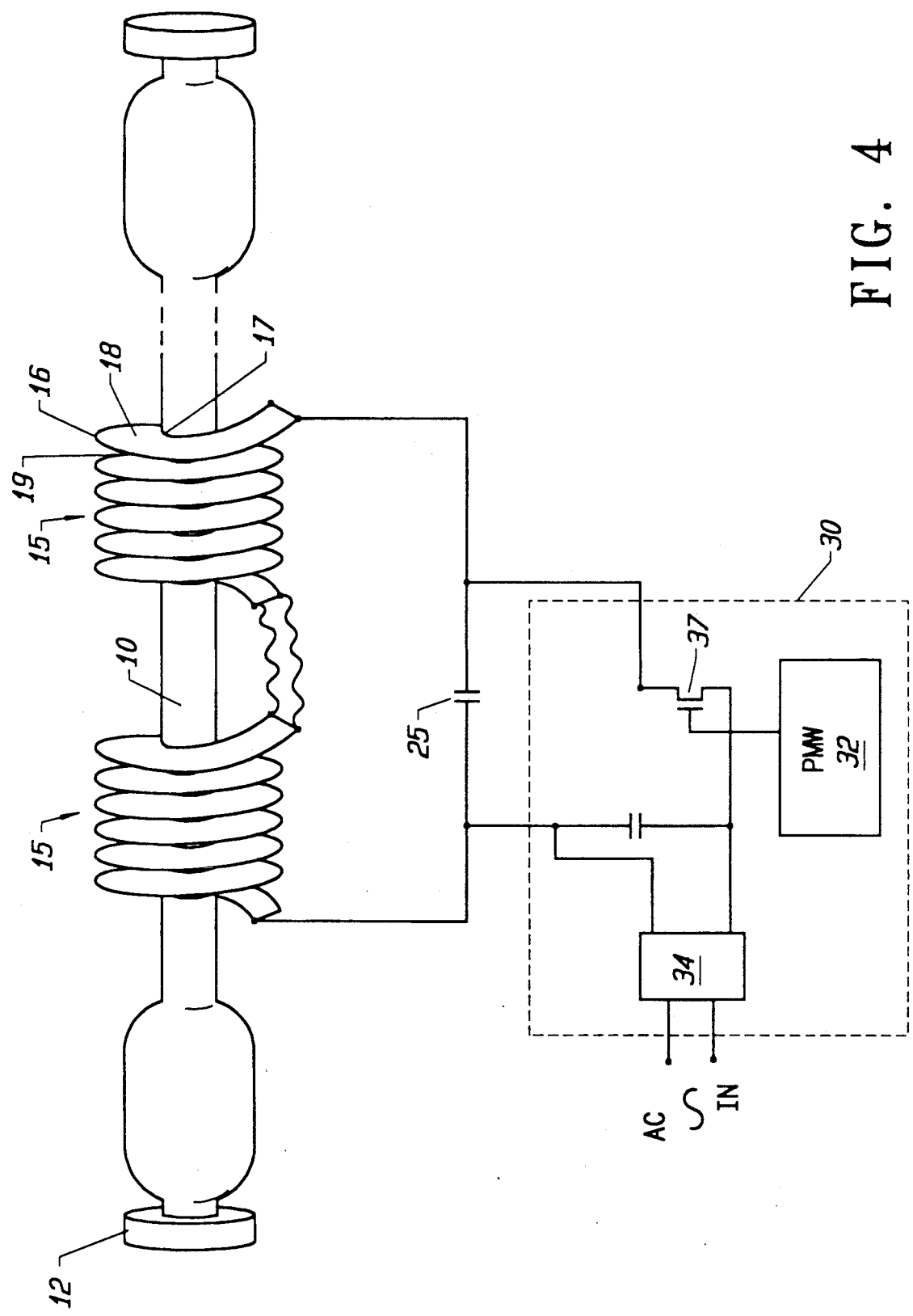
FIG. 4 is a schematic diagram of a fourth embodiment of the ion laser structure of the present invention showing an alternative power supply configuration including means for providing an axial magnetic field.

In still another alternative (FIG. 4) which utilizes coupling structures 10 to generate an axial magnetic field, RF power supply 30 may be designed to provide the DC to coupling structures 15, eliminating the need for DC supply 40. In this alternative, DC can be provided by eliminating the coupling transformer and using a single ended class C amplifier or oscillator configuration.

In yet another embodiment of the present invention, both permanent magnets 14 and DC supply 40 can be utilized to generate a magnetic field parallel to the axis of the laser bore. Such a structure allows for optimal sizing of permanent magnets 14 in relation to coupling structures 15 and greater control of the axial magnetic field strength.

Figure 3:
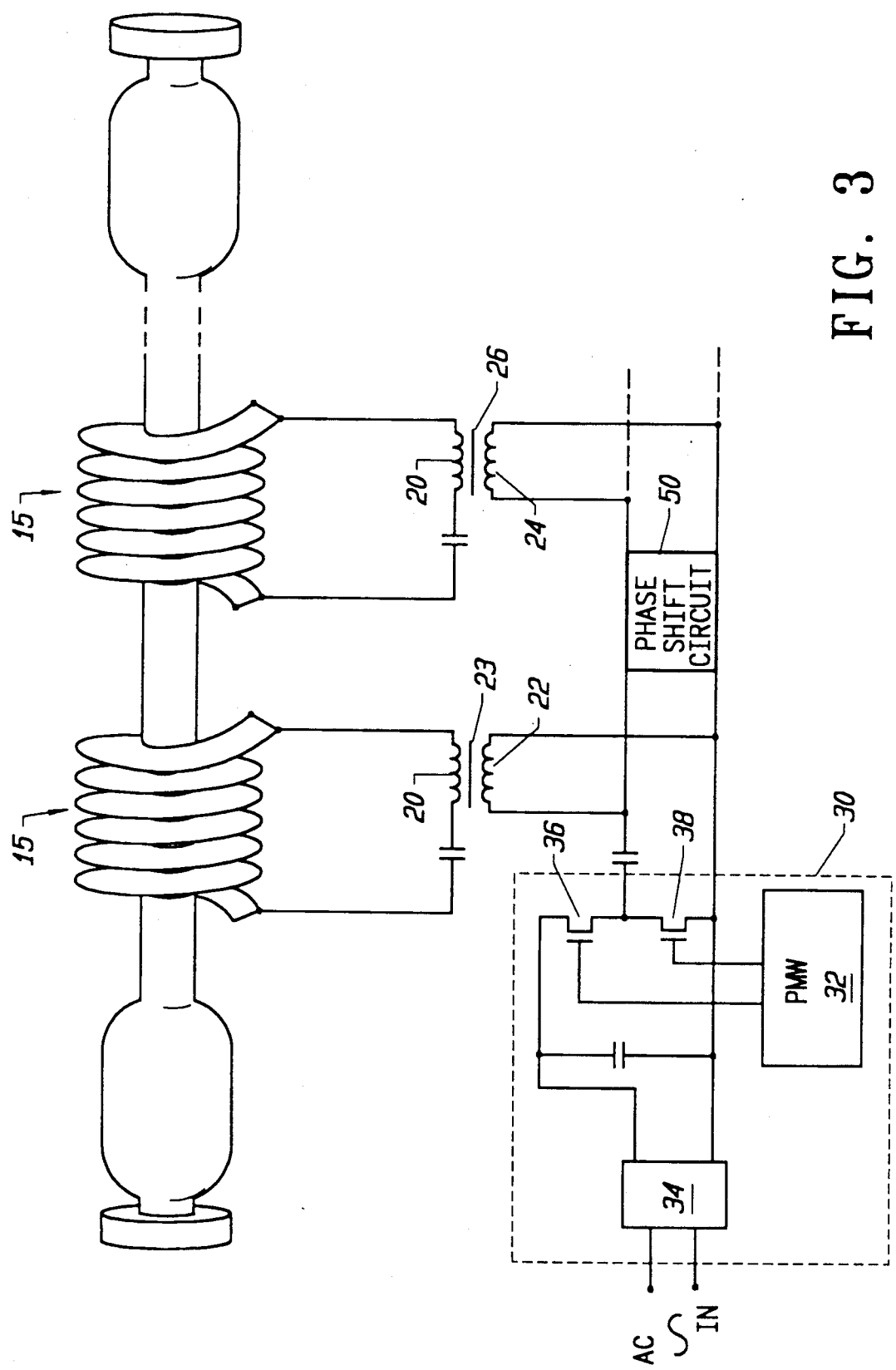
FIG. 3 is a schematic diagram of a third embodiment of the ion laser structure of the present invention utilizing multiphase coupling of the RF energy to the laser bore.

As mentioned above, the excitation means defined in the present invention in FIGS. 1-2 also allows for multiphase operation of the laser. FIG. 3 shows one such embodiment for employing multiphase operation.

In the embodiment of FIG. 3, a plurality of coupling structures 15 can be provided, depending on the length of laser tube 11 and laser bore 10, each having associated therewith a plurality of tank circuits comprised of a coupling structure 15, capacitor 25, and winding 20. A single power supply means 30 is coupled to a second winding 22 of the coupling transformer 23, as previously described. For each additional tank circuit, a phase shift circuit 50, associated with each additional tank circuit, is provided. Each phase shift circuit 50 may be coupled to the output of power supply 30 or may be coupled to the output of another phase shift circuit in a serial arrangement (not shown). The output of phase shift circuit 50 is coupled to a third winding 24 of an additional coupling transformer 26. Any number of additional tank circuits and phase shift circuits can be provided depending on the dimensions of the laser.

By selectively using any of a number of tank circuits with one or more coupling structures 15, a variety of multiphase operating characteristics can be implemented. Alternatively, separate power stages may be driven out of phase to provide multiphase excitation of the laser medium. In contrast to a system in which all coupling structures 15 would be in phase, multiphase operation would reduce amplitude modulation in the active medium. Multi-phase operation has the further advantage of reducing output ripple in the associated beam.

The aforementioned laser structure provides the advantages of virtually eliminating sputtering and the deterioration of the active gas medium associated with conventional excitation systems. Additionally, gas pumping utilized in conventional lasers to maintain a pure gas supply can be eliminated by the laser structure of the present invention. Further, a unique convective cooling system in lasers is provided through use of coupling structures brazed to the laser bore which function as both an RF energy coupling means and convection cooling fins. Still further, excitation of the active medium is optimized by a series injected tank circuit which reduces power losses over conventional parallel coupled voltage power supply designs. Still further, tapping the coupling structures to generate direct current provided to the coupling structures allows one to generate a magnetic field parallel to the axis of the laser bore which can eliminate the need for permanent magnets to generate such a field to control the discharge current in the laser bore.

The invention has been described with respect to particular embodiments thereof. Numerous variations are possible as will be apparent to a person of ordinary skill in the art after reading the present specification. The variations associated with the system are intended to be within the scope of the present invention as defined by the claims.

What is claimed is:

1. An ion laser comprising:
   a resonant cavity including an output coupler and a laser bore, said resonant cavity containing an active medium; and
   means for exciting said active medium to induce laser gain in said resonant cavity, said means for exciting including
      power supply means for generating a radio frequency (RF) output, and
      means for coupling said RF output to said active medium and for dissipating heat associated with said laser bore during the excitation of said active medium.

2. The ion laser as claimed in claim 1 wherein said active medium is a noble gas.

3. The ion laser as claimed in claim 2 wherein said noble gas is argon.

4. The ion laser as claimed in claim 2 wherein said noble gas is krypton.

5. The ion laser as claimed in claim 1 wherein said power supply means comprises a pulse width modulated switching power supply.

6. The ion laser as claimed in claim 1 wherein said means for coupling said RF output to said active medium includes a coupling structure surrounding said laser bore, said coupling structure generally characterized as having a helical shape.

7. The ion laser as claimed in claim 6 wherein said means for coupling said RF output to said active medium further includes tank circuit means including a capacitor coupled in series with said coupling structure, said coupling structure further acting as an inductor.

8. The ion laser as claimed in claim 7 wherein said RF output of said RF power supply is coupled into said tank circuit means utilizing an RF transformer having a primary winding and a secondary winding, wherein said secondary winding is connected in series with said capacitor and said coupling structure.

9. The ion laser as claimed in claim 8 wherein said RF transformer comprises a ferrite core having toroidal windings positioned about said ferrite core.

10. The ion laser as claimed in claim 6 further including means for generating an air flow directed about said coupling structure.

11. The ion laser as claimed in claim 6 wherein said coupling structure comprises a continuous material structure forming a plurality of annular rings, each ring having an inner edge and an outer edge, and a first side and a second side, said first and second sides having a parallel relationship.

12. The ion laser as claimed in claim 11 further including means for circulating a cooling fluid around said laser bore.

13. The ion laser as claimed in claim 1 including means for generating an axial magnetic field in said laser bore comprising at least one permanent magnet.

14. The ion laser as claimed in claim 13 wherein said at least one permanent magnet comprises at least two permanent magnets arranged about said laser bore in alternating polarities.

15. The ion laser as claimed in claim 1 wherein said means for coupling said RF energy to said laser bore comprises a coupling structure surrounding said laser bore in a collinear serial relationship thereto and, further including means for generating an axial magnetic field comprising means for providing direct current to said coupling structure.

16. An air cooled, RF excited, ion laser comprising:
a resonant cavity including an output coupler and a laser bore, said resonant cavity containing an active medium; and
means for exciting said active medium, said means for exciting comprising
power supply means for generating a radio frequency (RF) output, and
a plurality of coupling means for transmitting said RF output to said active medium, each said coupling means transmitting said RF output in a different phase relationship with respect to at least one other of said coupling means, said plurality of coupling means further for dissipating heat associated with said laser bore during the excitation of said active medium.

17. The laser as claimed in claim 16 wherein said plurality of coupling means comprises a plurality of coupling structures, said coupling structures surrounding said laser bore and generally characterized as having a helical shape.

18. The laser as claimed in claim 17 wherein said coupling means further includes a plurality of tank circuits, each of said tank circuits respectively associated with one of said plurality of coupling structures.

19. The laser as claimed in claim 17 wherein said at least one tank circuit includes at least one inductor and at least one capacitor.

20. The laser as claimed in claim 19 further including a plurality of means for shifting the phase angle relationship of said RF output of said power supply means, each said means for shifting being respectively associated with at least one of said plurality of tank circuits.

21. A laser comprising:
a resonant cavity including an output coupler and a laser bore, said resonant cavity containing an active medium;
a power supply means comprising a pulse width modulated switching power supply for providing a voltage in the RF frequency range to an output;
first inductor means coupled to the output of said power supply means;
a plurality of helical structures, each of said plurality of helical structures having associated therewith a tank circuit means including a second inductor, inductively coupled to said first inductor, and a capacitor;
means for generating a magnetic field along the axial length of said laser bore; and
means for dissipating heat from said laser bore upon excitation of said active medium.

22. A noble gas, ion laser, comprising:
a resonant cavity having an output coupler, an active laser medium and a laser bore, said active medium being a rare gas;
excitation means, including a pulse width modulated switching power supply capable of generating an RF output wherein said output is inductively coupled to a tank circuit, said tank circuit including an inductor, capacitor, and a helical structure coupled to and surrounding said laser bore in a collinear serial relationship thereto, for coupling said RF energy to said laser bore to excite said active medium;
cooling means comprising means for generating an air flow about said helical structure; and
means for generating a magnetic field along the axial length of said bore for positioning said excited active medium within said laser bore.

23. An ion laser comprising:
a resonant cavity including an output coupler and a laser bore, said resonant cavity containing an active medium; and
means for exciting said active medium to induce laser gain in said resonant cavity, said means for exciting including
power supply means for generating a radio frequency (RF) output and for generating a DC output,
means for coupling said RF output to said active medium and for dissipating heat associated with said laser bore during the excitation of said active medium, and
means for providing said DC output to said means for coupling to generate a magnetic field in said laser bore.

24. The ion laser as claimed in claim 23 wherein said power supply means comprises a single-ended forward converter including at least one MOSFET having source, drain, and gate electrodes, said gate electrode being coupled to a pulse width modulation means for controlling the output frequency of said converter, and wherein said drain electrode of said MOSFET is coupled to said means for coupling to provide said DC output.

* * * * *